Aug. 4, 1959     A. C. STUCKI     2,897,834
MEANS FOR AUTOMATICALLY SELECTING THE HIGHEST
OR LOWEST PRESSURE FROM A GROUP OF
CHANGING FLUID PRESSURES

Filed Feb. 19, 1954     2 Sheets-Sheet 1

INVENTOR:
Arthur C. Stucki

United States Patent Office 2,897,834
Patented Aug. 4, 1959

2,897,834

MEANS FOR AUTOMATICALLY SELECTING THE HIGHEST OR LOWEST PRESSURE FROM A GROUP OF CHANGING FLUID PRESSURES

Arthur C. Stucki, Rockville, Md.

Application February 19, 1954, Serial No. 411,324

5 Claims. (Cl. 137—101)

My invention relates to a system for the automatic selection and transmission of the lowest or the highest of a group of variable pressures.

One purpose of such a system is to gather various branch line pressures from a group of conventional pneumatic controllers and to select the lowest or highest pressure, as desired, for transmission to another mechanism to be controlled. The proper control of the latter mechanism being a function of the extreme demand of the individual branch line pressures.

For example, consider a heating system wherein individual zones of temperature are handled by a pneumatic thermostat in each zone. Each thermostat, upon a fall in temperature, causes a greater pressure to be transmitted to an individual damper motor which in turn allows more warm air, and less cold air, to enter that zone. A relay system such as mine can constantly transmit the highest pressure from any of the thermostats to a steam valve in order to allow only enough steam to heat the common air supply to the minimum temperature required to heat the coldest zone, therefore saving a considerable amount of heat in many applications.

The above illustration is merely a simple example of what such a system can do. The system has many applications in temperature, humidity, pressure, and other controlled processes.

Systems for doing the same thing have been in use for many years and are being manufactured by several corporations. My particular system for the selection of the highest or the lowest pressure is new, novel and much more simple.

Figure 1:
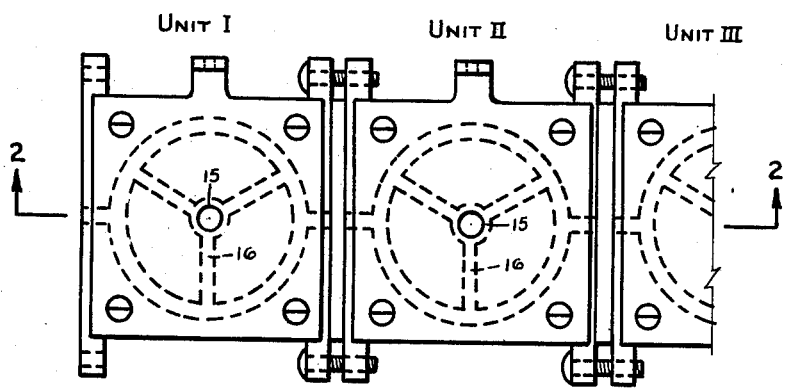
Figure 1 is a plan view showing a plurality of unit housings secured together, and partly broken away.
Figure 2:
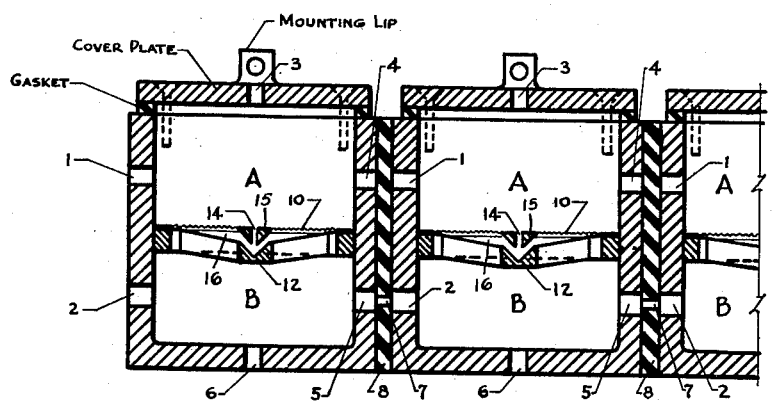
Figure 2 is a vertical cross section taken on the line 2—2 of Figure 1, looking in the direction of the arrows.

My system is composed of a plurality of single basic unit housings, as shown in Figures 1 and 2. Each housing unit has six (6) ports and an internal one way valve. The complete system is built by attaching a plurality of individual units to one another, using one unit for each pressure source from which pressure is to be selected. Certain ports are plugged, as required for the selection of the lowest or highest pressure, and the first unit (as shown at the left) is fitted with an orifice 17 to bleed fluid into or out of the system, respectively.

The housing units I, II and III, etc. are open to one another through a single port 7 in each of the gaskets 8 which are placed between each of the connected units. These gasket ports 7 are turned to be in alignment with either ports 1 and 4, or ports 2 and 5, thus connecting either chambers A or chambers B of adjacent housing units, as the application requires.

Referring to Figure 2, the housing units I, II, III etc. are identical in construction, the left and right sidewalls of the housings each being provided with a pair of ports, 1 and 2 in the left hand wall, and 4 and 5 in the right hand wall. The bottom of each housing is provided with a port 6 and the housing top is sealed with a cover plate having a port 3 therein. The side wall ports 1, 2, 4 and 5, are positioned so that when the housing units are placed side by side, ports 4 and 5 in the right hand wall of the unit I will be in alignment with ports 1 and 2 in the next succeeding unit II, and so on. In stacking the housing units so as to measure the highest or lowest of a plurality of pressures, the units I, II, III, etc. are each separated by a gasket 8 having a single aperture 7 therein. Thus, either ports 2 and 5 may be connected and ports 1 and 4 sealed, as shown in Figure 2, or simply by inverting the gasket 8, ports 1 and 4 may be connected and ports 2 and 5 sealed.

Within each unit a diaphragm 10 extends completely across the housing so as to divide said housing into two chambers A and B. A one-way valve constituted by conical element 15 having an orifice 14 therein is placed at the center of each diaphragm 10. A valve seat 12 is mounted beneath valve 15 on supporting spokes 16, best seen in outline form in Figure 1. When the pressure in the chamber B is higher than the pressure in the chamber A, the diaphragm 10 lifts and the chambers are connected by the orifice 14.

Figure 3:
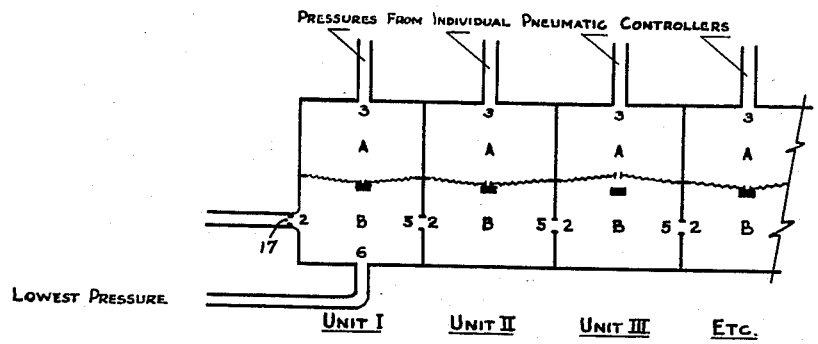
Figure 3 is a schematic view of the plural unit system connected to select and transmit the lowest of a plurality of pressures.

For simplicity of illustration, ports 1 and 4 have been omitted from Figure 3, thus indicating that those ports would be sealed by the gaskets 8 when the system is arranged to select the lowest pressure. Similarly, the omission of ports 2 and 5 from Figure 4 indicates that those ports would be sealed by the gaskets 8 whenever the system is arranged to select the highest pressure.

As illustrated in Figure 3, the lowest pressure of a group of variable pressures is selected by connecting the variable pressures to the ports 3. Port 2 of unit housing I is connected to a source of fluid at a pressure equal to or greater than the highest pressure ever expected through any of the ports 3. The port 2 in unit I permits pressure to bleed slowly inwardly through a small orifice to be distributed to all of the chambers B which, for this application, are connected by aligning the ports 7 of the gaskets 8, and ports 2 and 5 which adjoin one another. As soon as the pressure within the chamber B builds up to the lowest pressure in any chamber A, the one way valve in that unit opens and allows fluid to pass from chamber B to chamber A. The controller connected to that particular chamber A, through its port 3, has the capacity to bleed off any increase in pressure much more rapidly than the aforementioned orifice in port 2, unit I, can build it up. Therefore a balance is reached and the pressure in the connected chambers B becames equal to the lowest pressure in the individual chambers A. This pressure is then transmitted through the port 6 of unit I.

Figure 4:
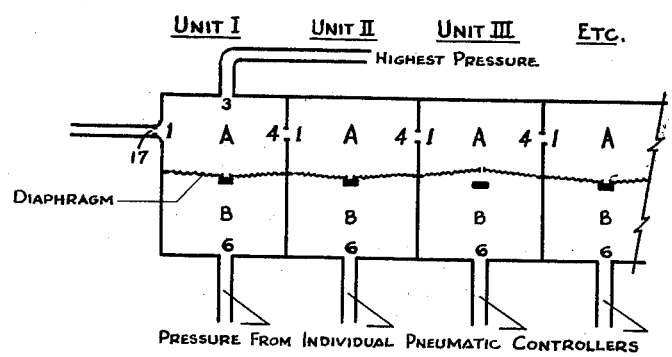
Figure 4 is a schematic view of the plural unit system connected to select and transmit the highest of a plurality of pressures.

As illustrated in Figure 4, the highest pressure of a group of variable pressures is selected by connecting the variable pressures to the ports 6. Port 1 of unit I is fitted with a small orifice 17 which leaks gas to the atmosphere. Chambers A are all connected to one another through the gasket ports 7, which in this case are aligned with ports 1 and 4 in adjacent units. Therefore, the pressure in the chambers A is equal to the highest pressure in a chamber B, since the latter has opened its diaphragm valve and is responsible for the pressure in the chambers A. The aforementioned leak orifice 17 in port 1 of unit I, leaks gas much slower than any of the controllers connected through the ports 6 can supply it. Therefore, pressure within the chambers A may be maintained and can be transmitted anywhere through the port 3 of unit I. The purpose of the bleed orifice 17 in the port 1 of unit I is to allow the pressure in the chambers A to lower itself in step with the maximum pressure in chamber B when it lowers.

I claim:

1. Apparatus for the selection and transmission of an extreme fluid pressure from amongst a plurality of variable fluid pressures, comprising a plurality of similar housings, means dividing each of said housings into a first sealed chamber and a second sealed chamber, a one-way valve in each of said housings to permit fluid to flow between said first and second chambers in but a single direction, means connecting said first chambers each to individual sources of variable fluid pressure, the extreme pressure of which is to be selected and transmitted, means interconnecting each of said second chambers to provide a common chamber, means including a bleed orifice for providing continuous flow within said common chamber thereby permitting said common fluid pressure and the extreme fluid pressure from amongst said plurality of variable fluid pressures to reach an equilibrium, and means for transmitting said common fluid pressure to a remote point for utilization, said common fluid pressure being equal to the extreme pressure from amongst said plurality of variable pressures.

2. Apparatus claimed in claim 1 wherein said means dividing each of said housings comprises a flexible diaphragm.

3. An apparatus claimed in claim 2 wherein said one-way valve is comprised by a conical element mounted on said diaphragm and having an aperture extending through said element and said diaphragm, and a valve seat fixed opposite said conical element so that flexure of said diaphragm will move said element into engagement with said seat.

4. Apparatus for selecting and transmitting the highest pressure from amongst a group of variable fluid pressures, comprising a plurality of similar housings, each housing being divided into a first chamber and a second chamber and having a one-way valve interconnecting said first chamber with said second chamber, said valve permitting fluid to flow only from said first chamber to said second chamber, means connecting said first chambers each to individual sources of variable fluid pressure, the highest pressure of which is to be selected and transmitted, means interconnecting each of said second chambers to provide a common chamber, means for venting fluid from said common chamber, said venting means including a flow limiting orifice for maintaining the fluid pressure within said common chamber equal to the pressure of that particular one of said first chambers from whence flow occurs, said pressure within said common chamber being equal to the highest pressure from amongst said plurality of variable pressures, and means for transmitting said pressure within said common chamber to a remote point for utilization.

5. An apparatus for selecting and transmitting the lowest pressure from amongst a group of variable fluid pressures, comprising a plurality of similar housings, each housing being divided into a first chamber and a second chamber and having a one-way valve interconnecting said first chamber with said second chamber, said valve permitting fluid to flow only from said first chamber to said second chamber, means connecting said second chambers each to individual sources of variable fluid pressure, the lowest pressure of which is to be selected and transmitted, means interconnecting each of said first chambers to provide a common chamber, means for admitting fluid to said common chamber, said last named means including a flow limiting orifice for maintaining the fluid pressure within the said common chamber equal to the pressure of that particular one of said second chambers connected to the individual source of fluid pressure which provides the lowest pressure from amongst said group of pressures, and means for transmitting said pressure within said common chamber to a remote point for utilization.

References Cited in the file of this patent

UNITED STATES PATENTS

| | | |
|---|---|---|
| 1,922,512 | Weingartner | Aug. 15, 1933 |
| 2,516,333 | Moore | July 25, 1950 |
| 2,518,244 | Moore | Aug. 8, 1950 |
| 2,606,066 | Thompson | Aug. 5, 1952 |
| 2,638,921 | Caldwell et al. | May 19, 1953 |
| 2,643,663 | Gold et al. | June 30, 1953 |
| 2,778,373 | Jaquith | Jan. 22, 1957 |